(12) United States Patent
Accapadi et al.

(10) Patent No.: US 8,359,449 B2
(45) Date of Patent: Jan. 22, 2013

(54) PRIORITIZING VIRTUAL REAL MEMORY PAGING BASED ON DISK CAPABILITIES

(75) Inventors: Mathew Accapadi, Austin, TX (US); Dirk Michel, Austin, TX (US); Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 12/640,733

(22) Filed: Dec. 17, 2009

(65) Prior Publication Data

US 2011/0153975 A1 Jun. 23, 2011

(51) Int. Cl.
*G06F 12/00* (2006.01)
(52) U.S. Cl. ......................................... 711/170; 711/158
(58) Field of Classification Search .................. 711/170, 711/158
See application file for complete search history.

(56) References Cited

U.S. PATENT DOCUMENTS

| 5,193,172 | A | * | 3/1993 | Arai et al. ..................... 718/104 |
| 5,426,752 | A | * | 6/1995 | Takahasi et al. .............. 711/209 |
| 6,496,916 | B1 | | 12/2002 | Fadavi-Ardekani et al. |
| 7,516,291 | B2 | | 4/2009 | van Riel et al. |
| 7,552,306 | B2 | | 6/2009 | Madhavarao et al. |
| 7,594,093 | B1 | | 9/2009 | Kancherla |
| 2007/0294494 | A1 | * | 12/2007 | Conti et al. ................... 711/158 |
| 2009/0182976 | A1 | | 7/2009 | Agesen |

* cited by examiner

*Primary Examiner* — Hashem Farrokh
(74) *Attorney, Agent, or Firm* — Yee & Associates, P.C.; Steven L. Bennett

(57) ABSTRACT

A method manages memory paging operations. Responsive to a request to page out a memory page from a shared memory pool, the method identifies whether a physical space within one of a number of paging space devices has been allocated for the memory page. If physical space within the paging space device has not been allocated for the memory page, a page priority indicator for the memory page is identified. The memory page is then allocated to one of a number of memory pools within one of the number of paging space devices. The memory page is allocated one of the memory pools according to the page priority indicator of the memory page. The memory page is then written to the allocated memory pools.

21 Claims, 4 Drawing Sheets

| | 420 | 430 | 440 | |
|---|---|---|---|---|
| | VIRTUAL PAGE NUMBER | PHYSICAL LOCATION | PAGE PRIORITY INDICATOR | PAGING DATA STRUCTURE 400 |
| PAGE ENTRIES 410 | 000001 | A46501 | 1 | |
| | 000002 | B2C162 | 2 | |
| | 000003 | A2F1GG | 3 | |

PRIORITIZING VIRTUAL REAL MEMORY PAGING BASED ON DISK CAPABILITIES

BACKGROUND

1. Field

The disclosure relates generally to a computer implemented method, computer implemented program code, and a data processing system. More specifically, the disclosure relates to a computer implemented method, computer implemented program code, and a data processing system for prioritizing virtual real memory paging based on disk capabilities.

2. Description of the Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platform resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are shared dis-jointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

Hypervisors such as those on IBM's mainframe products, as well as EMC's vmware have provided a means of virtualizing memory to partitions running on the physical hardware. This technique allows memory to move, based on demand from partition to partition on the virtualized system. The physical memory is managed by the hypervisor, and that management is mostly transparent to the partitions running on top of the hypervisor. This virtualized partition memory is sometimes referred to as virtual real memory (VRM).

The concept of hierarchical storage is currently being extended into commodity services. Some storage is faster or slower than other storage. For example, some disks may be fast with a lower capacity, while other disks may be faster with higher capacity. Solid-state disks offer an extreme example of these storage considerations. Solid-state disks can provide more than 100 times the performance of legacy disks, but typically with limited capacity.

However, the usage of memory within a partition may sometimes require a degree of prioritization. For example, mechanisms may be required by some processes that restrict or guarantee memory to various collections of processes. In one example, a real-time banking application may be guaranteed a large amount of memory, whereas a department web server may be limited to a modest amount of memory. Currently there is no known solution that takes into account prioritization of memory within a partition, virtual real memory, and virtual real memory between partitions.

SUMMARY

According to one embodiment of the present invention, a computer implemented method, a data processing system, and a computer program product, manage memory paging operations. Responsive to a request to page out a memory page from a shared memory pool, the method identifies whether a physical space within one of a number of paging space devices has been allocated for the memory page. If physical space within the paging space device has not been allocated for the memory page, a page priority indicator for the memory page is identified. The memory page is then allocated to one of a number of memory pools within one of the number of paging space devices. The memory page is allocated to one of the memory pools according to the page priority indicator of the memory page. The memory page is then written to the allocated memory pools.

DETAILED DESCRIPTION

Figure 1:
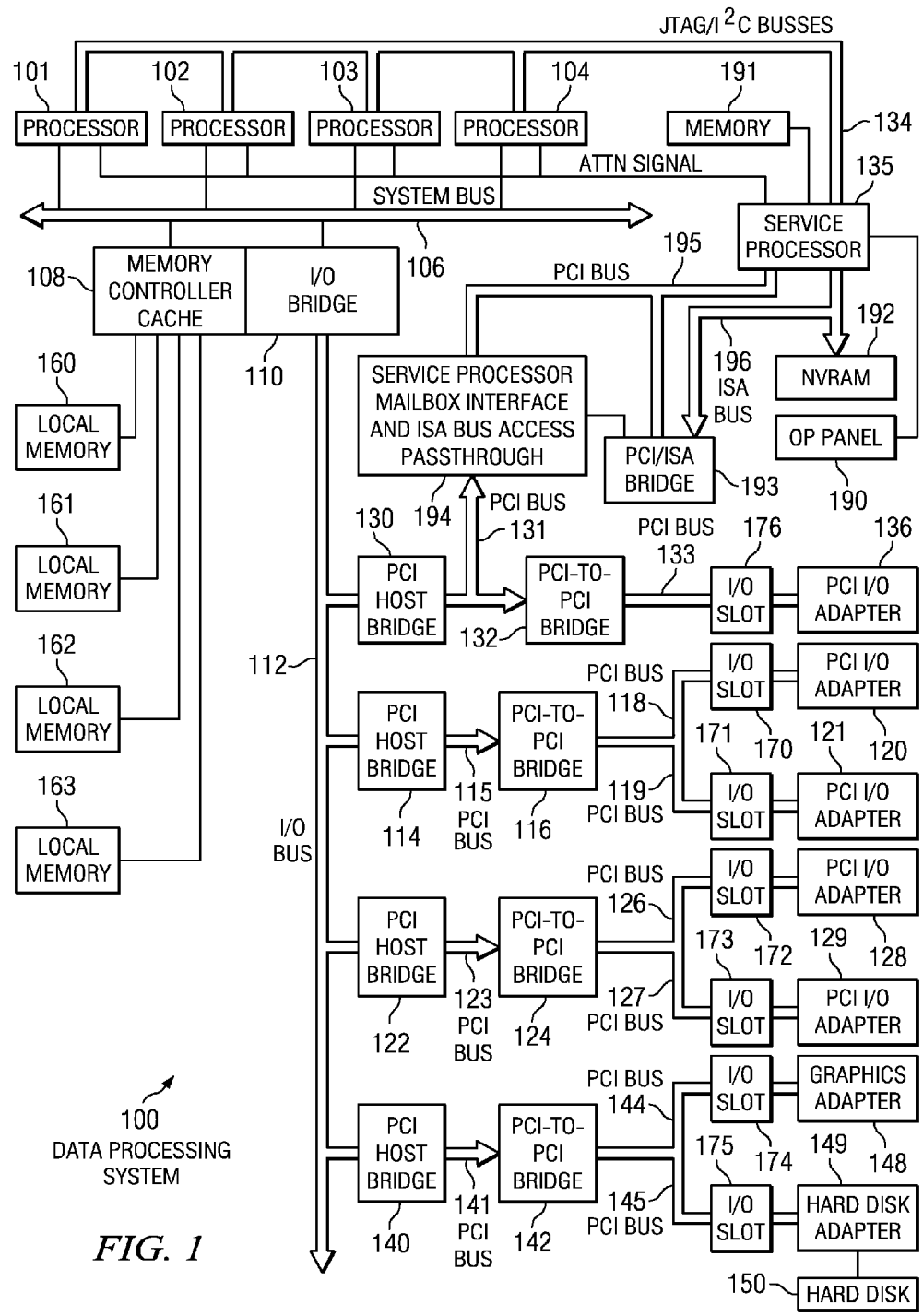
FIG. 1 is a block diagram of a data processing system in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by, or in connection with, an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and I/O bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and I/O adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I²C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to, or in place of, the hardware depicted. The depicted example is not meant to imply architectural limitations with respect to illustrative embodiments.

Figure 2:
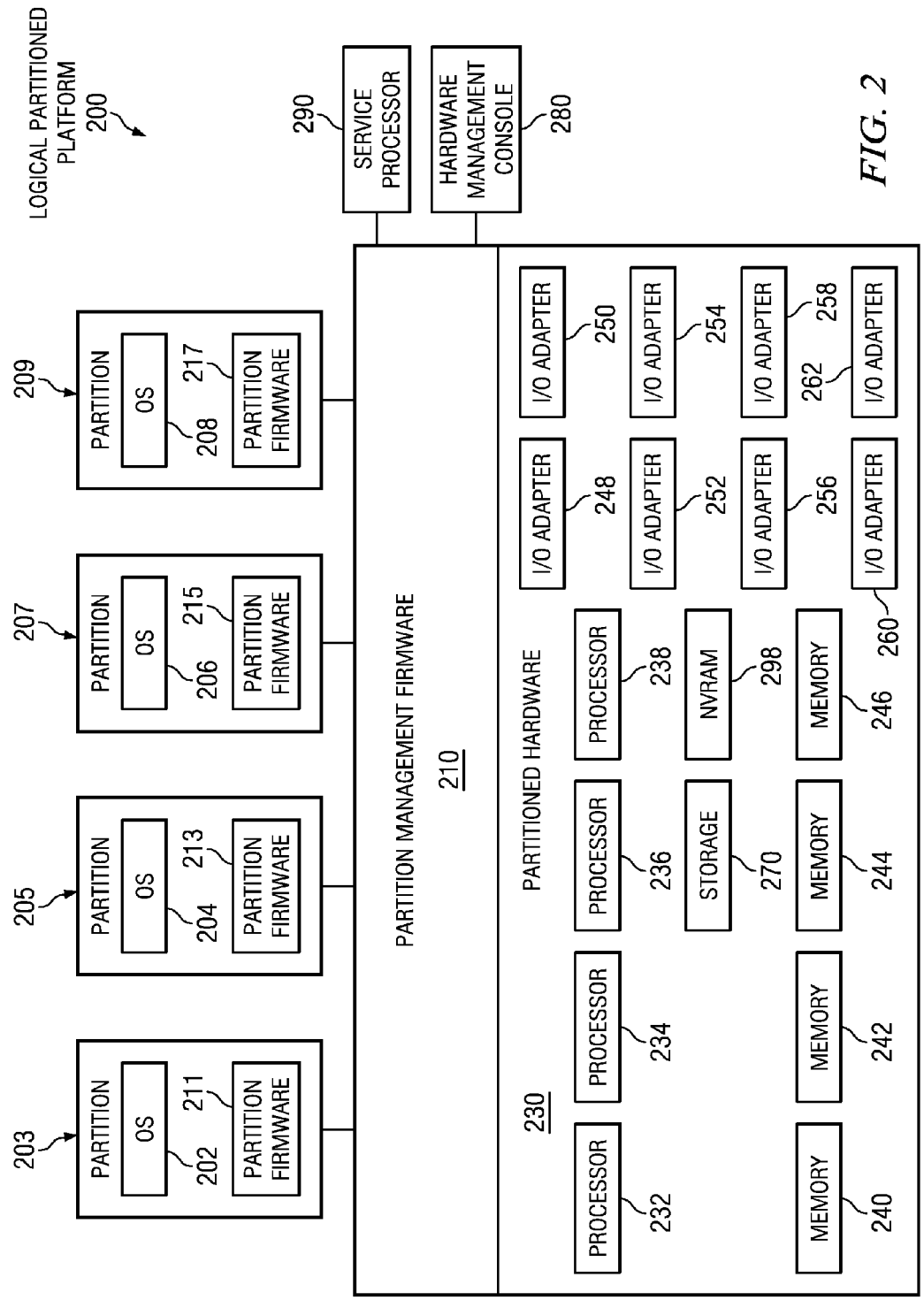
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

Illustrative embodiments provide a method for managing memory wherein prioritized pages are mapped to real memory having performance characteristics. Each page of memory is provided with a priority value. Partition management firmware maps pages of higher priorities to physical memory or higher performance paging storage. Partition management firmware maps pages of lower priorities to lower performing paging storage.

If an operating system determines that a page in memory will need to have a fast access time, partition management firmware can use a high value set in the page frame structure to indicate that the page should come from actual real memory. If the operating system determines that the page frame is of medium priority, partition management firmware can use this value to use disk-based memory but have the memory be mapped on the fast disks in the storage server. If the operating system determines that the page frame is of low priority, partition management firmware can use this value to use disk-based memory but have the memory be on slower disks in the storage server.

Illustrative embodiments provide a method for managing memory paging operations. Responsive to a request to page out a memory page from a shared memory pool, the method identifies whether a physical space within one of a number of paging space devices has been allocated for the memory page. If physical space within the paging space device has not been allocated for the memory page, a page priority indicator for the memory page is identified. The memory page is then allocated to one of a number of memory pools within one of the number of paging space devices. The memory page is allocated to one of the memory pools according to the page priority indicator of the memory page. The memory page is then written to the allocated memory pools.

Figures 3, 4:
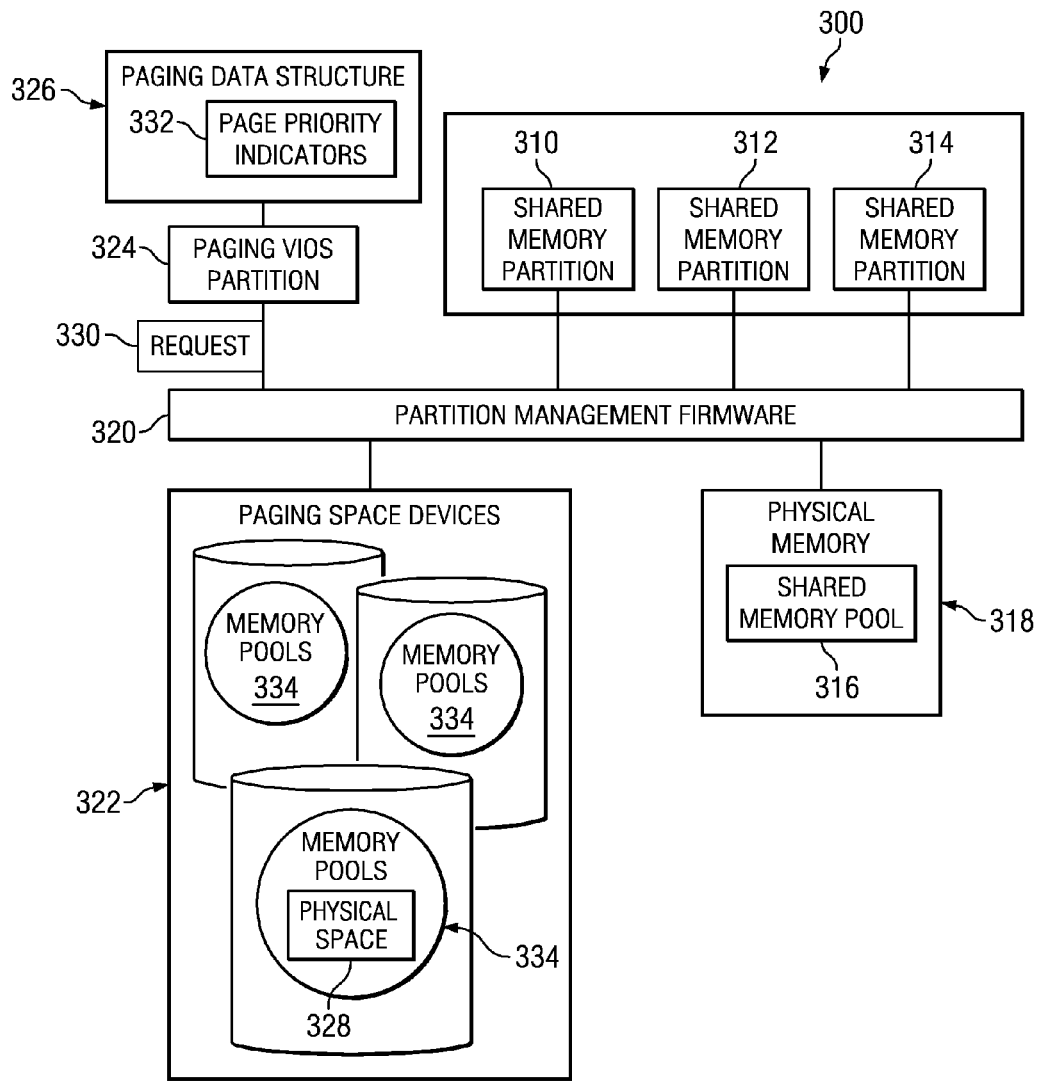
FIG. 3 is a logical partitioned platform having a physically overcommitted shared memory configuration according to an illustrative embodiment.
FIG. 4 is a paging data structure including a page priority indicator according to an illustrative embodiment.

Referring now to FIG. 3, a logical partitioned platform having a physically overcommitted shared memory configuration is shown according to an illustrative embodiment. Logical partitioned platform 300 is a logically partitioned platform such as logically partitioned platform 200 of FIG. 2.

Shared memory partitions 310, 312, and 314 are partitions, such as partitions 203, 205, 207, and 209 of FIG. 2, of memory allocated to shared memory pool 316 from physical memory 318. Shared memory pool 316 is a defined collection of physical memory blocks that are managed as a single memory pool by partition management firmware 320. Shared memory within shared memory pool 316 is a portion of physical memory 318 that is assigned to shared memory pool 316 and shared among shared memory partitions 310, 312, and 314. Partition management firmware 320 is partition management firmware such as partition management firmware 210 of FIG. 2.

Partition management firmware 320 does not assign a dedicated amount of physical memory 318 to each of shared memory partitions 310, 312, and 314. Instead, partition management firmware 320 constantly provides memory as needed from shared memory pool 316 to each of shared memory partitions 310, 312, and 314. Partition management firmware 320 provides portions of the shared memory pool that are not currently being used by shared memory partitions to other shared memory partitions that need to use the memory. Each of shared memory partitions 310, 312, and 314 share that portion of physical memory 318 that is assigned to shared memory pool 316 with others of shared memory partitions 310, 312, and 314.

Partition management firmware 320 determines the amount of memory allocated from shared memory pool 316 to each of shared memory partitions 310, 312, and 314 based on the workload and memory configuration of each of shared memory partitions 310, 312, and 314. When allocating physical memory 318 to shared memory partitions 310, 312, and 314, partition management firmware 320 ensures that each of shared memory partitions 310, 312, and 314 can access only a portion of shared memory pool 316 allocated to the shared memory partition at any given time. Shared memory partitions 310, 312, and 314 cannot access the physical memory of shared memory pool 316 allocated to another of shared memory partitions 310, 312, and 314.

When one of shared memory partitions 310, 312, and 314 needs more memory than a current amount of unused memory in the shared memory pool 316, Partition management firmware 320 stores a portion of the memory that belongs to the shared memory partition in paging space devices 322. Paging space devices 322 is nonvolatile storage used to hold portions of a shared memory partition's logical memory that do not reside in shared memory pool 316. In one illustrative embodiment, paging space devices 322 is a hard disk, such as hard disk 150 of FIG. 1.

Access to paging space devices 322 is provided by paging VIOS partition 324. Paging VIOS partition 324 is a logical partition, such as one of partitions 203, 205, 207, and 209 of FIG. 2, that provides access to paging space devices 322 required for shared memory partitions 310, 312, and 314 in an overcommitted memory configuration. When the operating system in one of shared memory partitions 310, 312, and 314, such as operating systems 202, 204, 206, or 208 of FIG. 2, attempts to access data that is located in paging space devices 322, partition management firmware 320 directs a paging VIOS partition 324 to retrieve the data from paging space devices 322 and write to shared memory pool 316 so that the operating system can access the data.

When an operating system or other program within one of shared memory partitions 310-314 first begins executing, the operating system copies a small portion of the process address space from a program file stored on disk, such as hard disk 150 of FIG. 1, into shared memory pool 316. This portion typically includes the first page of instructions and possibly a small amount of data that is needed at start-up. As more instructions or data are needed, the operating system brings in pages from the process' address on demand.

When an operating system within one of shared memory partitions 310-314 needs access to a specific resource, instruction, or data, that particular one of shared memory partitions 310-314 must establish a virtual memory page to real memory mapping for the resource. The operating system of the particular one of shared memory partitions 310-314 makes a request to partition management firmware 320 to access the resource. Partition management firmware 320 checks paging data structure 326 to determine whether the physical resource has been mapped as a virtual resource. Paging data structure 326 is a data structure containing mappings of virtual memory space to physical space 328 within one of memory pools 334 of one of paging space devices 322. Paging data structure 326 can be, for example, but not limited to, a data structure such as an array, a list, a binary tree, a B-tree, a heap, a hash, or a graph.

Paging data structure 326 contains page entries. Each of the page entries is assigned one of page priority indicators 332. Page priority indicators 332 are hierarchical indications of the relative importance of the corresponding page.

If the physical resource has been mapped, partition management firmware 320 grants the particular one of shared memory partitions 310-314 access to the virtual resource. If the physical resource has not been mapped, partition management firmware 320 creates a new entry in paging data structure 326. Physical space at paging space devices 322 can be allocated either at the time the entry is made, or at a subsequent time when request 330 is received for paging page 332 out from shared memory pool 316.

The illustration of logical partitioned platform 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Referring now to FIG. 4, a paging data structure including a page priority indicator is shown according to an illustrative embodiment. Paging data structure 400 can be a paging data structure such as paging data structure 326 of FIG. 3.

Paging data structure 400 includes page entries 410. Each of page entries 410 is a mapping of a page of virtual memory to the physical page frame that the virtual memory page mirrors. Therefore, each of page entries 410 correspond to one of virtual page numbers 420, and one of physical locations 430.

Each of page entries 410 also is assigned one of page priority indicators 440. Page priority indicators 440 are hierarchical indications of the relative importance of the corresponding page.

By utilizing priority indicators 440, a partition management firmware, such as partition management firmware 320 of FIG. 3, can determine how to allocate pages to various memory pools on paging space devices, such as paging space devices 322 of FIG. 3, to better utilize system resources and improve performance of paging operations. Page entries with a higher page priority indicator 440 can be mapped to memory pools on physical memory, such as physical memory 318 of FIG. 3, or to memory pools on higher performance paging storage devices. Page entries having a lower page priority indicator 440 can be mapped to memory pools on lower performing paging storage.

In one illustrative embodiment, every real memory page frame structure is associated with one of a page priority indicator 440. As a simple example, page priority indicator 440 could be a predetermined value indicating a relative importance of data within the real memory page frame. In one illustrative embodiment, the predetermined value is an indication of a low priority, a medium priority, or a high priority. In one illustrative embodiment, the predetermined value is an extended range of values. If an operating system determines that a page in memory will need to have the fast access time, the page can be given a high value page priority indicator 440. The relatively high value page priority indicator 440 can be used by partition management firmware, such as partition management firmware 320 of FIG. 3, to indicate that, in response to a paging out of the page to a paging space device, such as one of paging space devices 322 of FIG. 3, the page should be paged into actual real memory, such as physical memory 318 of FIG. 3. If the operating system determines that the page frame is of medium priority, the page can be given a relatively medium value page priority indicator 440. The relatively medium value page priority indicator 440 can be used by partition management firmware to indicate that the page use disk based memory, but have the memory be mapped on faster disks of the paging space devices. If the operating system determines that the page frame is of low priority, the page can be given a relatively low value page priority indicator 440. The relatively low value page priority indicator 440 can be used by partition management firmware to indicate that the page use disk based memory, but have the memory be on slower disks of the paging space devices.

Figure 5:
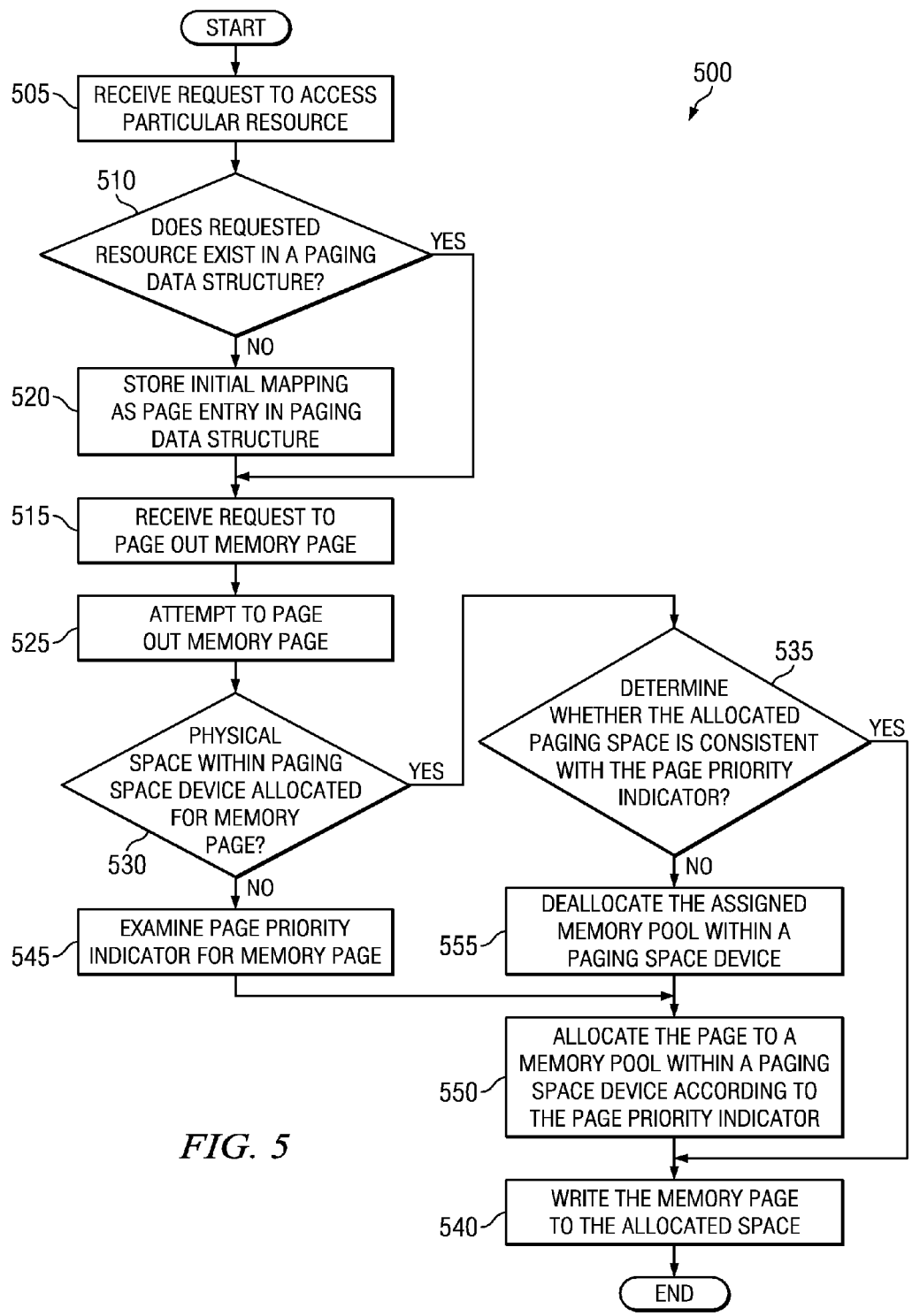
FIG. 5 is a flowchart for processing memory-paging operations according to an illustrative embodiment.

Referring now to FIG. 5, a flowchart for processing memory paging operations is shown according to an illustrative embodiment. Process 500 is a software process, executing on a software component, such as partition management firmware 320 of FIG. 3.

Process 500 begins by receiving a request to access particular resource (step 505). When an operating system or other program within a shared memory partition first begins executing, the operating system copies a small portion of the process address space from a program file stored on disk, such as hard disk into a shared memory pool. As more resources, including instructions or data are needed, the operating system brings in pages from the process' address on demand.

Responsive to receiving the request, process 500 determines whether the requested resource exists in a paging data structure (step 510). The paging data structure can be paging data structure 326 of FIG. 3. If the page exists in the paging data structure, the requested physical resource has already been mapped as a virtual resource.

Responsive to determining that the requested resource does not exist in the paging data structure ("no" at step 510), an initial mapping is stored as a page entry within the paging data structure (step 520). The page entry can be one of page entries 420 of FIG. 4. The page entry includes a virtual page number, such as virtual page number 420 of FIG. 4, and a page priority indicator, such as page priority indicator 440 of FIG. 4. Depending on the implementation of the paging process, the paging data structure may or may not yet include a physical location, such as physical location 430 of FIG. 4.

If the physical resource has been mapped, the partition management firmware grants the particular one of shared memory partitions access to the virtual resource. If the physical resource has not been mapped, partition management firmware creates a new entry in paging data structure. Physical space at paging space devices can be allocated either at the time the entry is made, or at a subsequent time when the page is paged out from shared memory pool.

By utilizing priority indicators, process 500 can determine how to allocate pages to various memory pools on various paging space devices to better utilize system resources and improve performance of paging operations. If the page will need to have the fast access time, the page can be given a higher value page priority indicator. If the page does not need to have the fast access time, the page can be given a lower value page priority indicator.

At a subsequent time, the page may need to be paged out of shared memory to make room for other pages to be utilized. Responsive to receiving a request to page out the memory page (step 515), process 500 attempts to page out the memory page (step 525). To page the memory page out of shared memory pool, process 500 first determines whether physical space within a paging space device has been allocated for the memory page (step 530).

Process 500 determines whether physical space within a paging space device has been allocated for the memory page by examining the page entry within the paging data structure that corresponds to the memory page (step 530). Memory pages that have been allocated space at a paging device will be mapped to a physical location, such as indicated in physical locations 430 of FIG. 4.

Responsive to determining that physical space within a paging space device has been allocated for the memory page ("yes" at step 530), process 500 determines whether the allocated paging space is consistent with the page priority indicator (step 535). A page may become more or less important to programs executing within an operating system. Pages whose priority has changed can be remapped to different ones of the various paging space devices, based on their current, changed page priority indicator.

Responsive to determining that the allocated paging space is consistent with the page priority indicator ("yes" at step 535), process 500 writes the memory page to the allocated space (step 540), with the process terminating thereafter.

Returning now to step 530, responsive to determining that physical space within a paging space device has not been allocated for the memory page ("no" at step 530), process 500 examines the page priority indicator for the memory page (step 545). By utilizing priority indicators, process 500 can determine how to allocate pages to various memory pools on various paging space devices to better utilize system resources and improve performance of paging operations.

Process 500 then allocates the page to a memory pool within a paging space device, according to the page priority indicator (step 550). Page entries with a higher page priority indicator are mapped to memory pools on physical memory, or to memory pools on higher performance paging storage devices. Page entries having a lower page priority indicator are mapped to memory pools on lower performing paging storage. Responsive to allocating the page to a memory pool within a paging space device, according to the page priority indicator, process 500 writes the memory page to the allocated space (step 540), with the process terminating thereafter.

Returning now to step 535, responsive to determining that the allocated paging space is consistent with the page priority indicator ("no" at step 535), process 500 deallocates the assigned memory pool within a paging space device (step 555). Process 500 can deallocate the assigned memory pool simply by removing the mapping of the page to the assigned memory pool. Because the priority for the page has changed, a new allocation reflecting the new page priority indicator should be assigned to the page. Process 500 then proceeds to step 550, allocating the page to a memory pool within a paging space device, according to the page priority indicator, with the process terminating thereafter.

Thus, illustrative embodiments described herein provide a method for managing memory wherein prioritized pages are mapped to real memory having performance characteristics. Each page of memory is provided with a priority value. Partition management firmware maps pages of higher priorities to physical memory or higher performance paging storage. Partition management firmware maps pages of lower priorities to lower performing paging storage.

If an operating system determines that a page in memory will need to have a fast access time, partition management firmware can use a high value set in the page frame structure to indicate that the page should come from actual real memory. If the operating system determines that the page frame is of medium priority, partition management firmware can use this value to use disk-based memory but have the memory be mapped on the fast disks in the storage server. If the operating system determines that the page frame is of low priority, partition management firmware can use this value to use disk-based memory but have the memory be on slower disks in the storage server.

Thus, the illustrative embodiments provide a method for managing memory paging operations. Responsive to a request to page out a memory page from a shared memory pool, the method identifies whether a physical space within one of a number of paging space devices has been allocated for the memory page. If physical space within the paging space device has not been allocated for the memory page, a page priority indicator for the memory page is identified. The memory page is then allocated to one of a number of memory pools within one of the number of paging space devices. The memory page is allocated to one of the memory pools according to the page priority indicator of the memory page. The memory page is then written to the allocated memory pools.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing memory paging operations, the computer implemented method comprising:

responsive to a request to page out a memory page from a shared memory pool identifying whether a physical space within one of a number of paging space devices has been allocated for the memory page;

responsive to determining that the physical space within the paging space device has not been allocated for the memory page, identifying a page priority indicator for the memory page;

responsive to identifying a page priority indicator for the memory page, allocating the memory page to one of a number of memory pools within one of the number of paging space devices, wherein the memory page is allocated to the one of the number of memory pools according to the page priority indicator of the memory page; and responsive to allocating the memory page to one of a number of memory pools within one of the number of paging space devices, writing data of the memory page to the one of the number of memory pools.

2. The computer implemented method of claim 1, wherein the number of paging space devices is selected from the group consisting of physical memory, disk based memory, and combinations thereof, and wherein the step of allocating the memory page to one of the number of memory pools further comprises:

allocating the memory page to one of the number of memory pools according to the page priority indicator of the memory page and according to access times for the number of memory pools.

3. The computer implemented method of claim 1, further comprising:

responsive to identifying that the physical space within the paging space device has been allocated for the memory page, identifying the page priority indicator for the memory page and the physical space;

identifying whether the page priority indicator for the memory page is consistent with the physical space within the paging space device that has been allocated for the memory page;

responsive to identifying that the page priority indicator for the memory page is not consistent with the physical space within the paging space device that has been allocated for the memory page, deallocating the physical space within the paging space device that has been allocated for the memory page;

allocating the memory page to a second one of the number of memory pools within one of the number of paging space devices, wherein the memory page is allocated to the second one of the number of memory pools according to the page priority indicator of the memory page; and responsive to allocating the memory page to the second one of the number of memory pools within one of the number of paging space devices, writing the memory page to the second one of the number of memory pools.

4. The computer implemented method of claim 1, wherein the step of allocating the memory page to one of the number of memory pools within one of the number of paging space devices further comprises:

allocating the memory page to one of the number of memory pools within a faster-accessing one of the number of paging space devices if the page priority indicator indicates the memory page is a high priority memory page; and allocating the memory page to one of the number of memory pools within a slower-accessing one of the number of paging space devices if the page priority indicator indicates the memory page is a low priority memory page.

5. The computer implemented method of claim 1, wherein the step of identifying whether the physical space within one of the number of paging space devices has been allocated for the memory page further comprises:

responsive to receiving a request to page out a memory page from the shared memory pool of a logically partitioned platform, identifying whether the physical space within one of the number of paging space devices has been allocated for the memory page, wherein each of the number of shared memory partitions within the logically partitioned platform can access only a portion of the shared memory pool that is allocated to that one of the number of shared memory partitions.

6. The computer implemented method of claim 1, wherein the memory page is a first memory page, the method further comprising:

receiving a request to access a second memory page;

responsive to receiving the request to access the second memory page, requesting to page out the first memory page from the shared memory pool.

7. The computer implemented method of claim 1, further comprising:

responsive to the request to page out the memory page from the shared memory pool, identifying whether the physical space within one of the number of paging space devices has been allocated for the memory page, wherein the memory page has been allocated the physical space if the memory page is mapped to the physical space within a paging data structure;

responsive to determining that the physical space within the paging space device has not been allocated for the memory page, identifying the page priority indicator for the memory page from the paging data structure;

responsive to identifying the page priority indicator for the memory page, allocating the memory page to one of the number of memory pools within one of the number of paging space devices, wherein the memory page is allocated to the one of the number of memory pools according to the page priority indicator of the memory page; and mapping the memory page to the physical space within the paging data structure.

8. A tangible computer storage medium having a computer program product encoded thereon for managing memory paging operations, the computer program product comprising:

instructions, responsive to a request to page out a memory page from a shared memory pool, for identifying whether a physical space within one of a number of paging space devices has been allocated for the memory page;

instructions, responsive to determining that the physical space within the paging space device has not been allocated for the memory page, for identifying a page priority indicator for the memory page;

instructions, responsive to identifying a page priority indicator for the memory page, for allocating the memory page to one of a number of memory pools within one of the number of paging space devices, wherein the memory page is allocated to the one of the number of memory pools according to the page priority indicator of the memory page; and instructions, responsive to allocating the memory page to one of a number of memory pools within one of the number of paging space devices, for writing data of the memory page to the one of the number of memory pools.

9. The tangible computer storage medium of claim 8, wherein the number of paging space devices is selected from the group consisting of physical memory, disk based memory, and combinations thereof, and wherein the instructions for allocating the memory page to one of the number of memory pools further comprises:

instructions for allocating the memory page to one of the number of memory pools according to the page priority indicator of the memory page and according to access times for the number of memory pools.

10. The tangible computer storage medium of claim 8, further comprising:

instructions, responsive to identifying that the physical space within the paging space device has been allocated for the memory page, for identifying the page priority indicator for the memory page and the physical space;

instructions for identifying whether the page priority indicator for the memory page is consistent with the physical space within the paging space device that has been allocated for the memory page;

instructions, responsive to identifying that the page priority indicator for the memory page is not consistent with the physical space within the paging space device that has been allocated for the memory page, for deallocating the physical space within the paging space device that has been allocated for the memory page;

instructions for allocating the memory page to a second one of the number of memory pools within one of the number of paging space devices, wherein the memory page is allocated to the second one of the number of memory pools according to the page priority indicator of the memory page; and instructions, responsive to allocating the memory page to the second one of the number of memory pools within one of the number of paging space devices, for writing the memory page to the second one of the number of memory pools.

11. The tangible computer storage medium of claim 8, wherein the instructions for allocating the memory page to one of the number of memory pools within one of the number of paging space devices further comprises:
- instructions for allocating the memory page to one of the number of memory pools within a faster-accessing one of the number of paging space devices if the page priority indicator indicates the memory page is a high priority memory page; and
- instructions for allocating the memory page to one of the number of memory pools within a slower-accessing one of the number of paging space devices if the page priority indicator indicates the memory page is a low priority memory page.

12. The tangible computer storage medium of claim 8, wherein the instructions for identifying whether the physical space within one of the number of paging space devices has been allocated for the memory page further comprises:
- instructions, responsive to receiving a request to page out a memory page from the shared memory pool of a logically partitioned platform, for identifying whether the physical space within one of the number of paging space devices has been allocated for the memory page, wherein each of the number of shared memory partitions within the logically partitioned platform can access only a portion of the shared memory pool that is allocated to that one of the number of shared memory partitions.

13. The tangible computer storage medium of claim 8, wherein the memory page is a first memory page, the method further comprising:
- instructions for receiving a request to access a second memory page;
- instructions, responsive to receiving the request to access the second memory page, for requesting to page out the first memory page from the shared memory pool.

14. The tangible computer storage medium of claim 8, further comprising:
- instructions, responsive to the request to page out the memory page from the shared memory pool, for identifying whether the physical space within one of the number of paging space devices has been allocated for the memory page, wherein the memory page has been allocated the physical space if the memory page is mapped to the physical space within a paging data structure;
- instructions, responsive to determining that the physical space within the paging space device has not been allocated for the memory page, for identifying the page priority indicator for the memory page from the paging data structure;
- instructions, responsive to identifying the page priority indicator for the memory page, for allocating the memory page to one of the number of memory pools within one of the number of paging space devices, wherein the memory page is allocated to the one of the number of memory pools according to the page priority indicator of the memory page; and
- instructions for mapping the memory page to the physical space within the paging data structure.

15. A data processing system comprising:
- a storage having a computer program product encoded thereon for managing memory paging operations;
- a bus system connecting the memory to a processor; and
- a processor, wherein the processor executes the computer usable program code: responsive to a request to page out a memory page from a shared memory pool, to identify whether a physical space within one of a number of paging space devices has been allocated for the memory page; responsive to determining that the physical space within the paging space device has not been allocated for the memory page, to identify a page priority indicator for the memory page; responsive to identifying the page priority indicator for the memory page, to allocate the memory page to one of a number of memory pools within one of the number of paging space devices, wherein the memory page is allocated to the one of the number of memory pools according to the page priority indicator of the memory page; and responsive to allocating the memory page to one of a number of memory pools within one of the number of paging space devices, to write data of the memory page to the one of the number of memory pools.

16. The data processing system of claim 15, wherein the number of paging space devices is selected from the group consisting of physical memory, disk based memory, and combinations thereof, and wherein the processor executing the computer usable program code to allocate the memory page to one of the number of memory pools further comprises the processor executing the computer usable program code:
- to allocate the memory page to one of the number of memory pools according to the page priority indicator of the memory page and according to access times for the number of memory pools.

17. The data processing system of claim 15, wherein the processor further executes the computer usable program code:
- responsive to identifying that the physical space within the paging space device has been allocated for the memory page, to identify the page priority indicator for the memory page and the physical space; to identifying whether the page priority indicator for the memory page is consistent with the physical space within the paging space device that has been allocated for the memory page; responsive to identifying that the page priority indicator for the memory page is not consistent with the physical space within the paging space device that has been allocated for the memory page, to deallocate the physical space within the paging space device that has been allocated for the memory page; to allocate the memory page to a second one of the number of memory pools within one of the number of paging space devices, wherein the memory page is allocated to the second one of the number of memory pools according to the page priority indicator of the memory page; and responsive to allocating the memory page to the second one of the number of memory pools within one of the number of paging space devices, to write the memory page to the second one of the number of memory pools.

18. The data processing system of claim 15, wherein the processor executing the computer usable program code to allocate the memory page to one of the number of memory pools within one of the number of paging space devices further comprises the processor executing the computer usable program code:
- to allocate the memory page to one of the number of memory pools within a faster-accessing one of the number of paging space devices if the page priority indicator indicates the memory page is a high priority memory page; and
- to allocate the memory page to one of the number of memory pools within a slower-accessing one of the number of paging space devices if the page priority indicator indicates the memory page is a low priority memory page.

19. The data processing system of claim 15, wherein the processor executing the computer usable program code to identify whether the physical space within one of the number of paging space devices has been allocated for the memory page further comprises the processor executing the computer usable program code:

responsive to receiving a request to page out a memory page from the shared memory pool of the logically partitioned platform, to identify whether the physical space within one of the number of paging space devices has been allocated for the memory page, wherein each of the number of shared memory partitions within the logically partitioned platform can access only a portion of the shared memory pool that is allocated to that one of the number of shared memory partitions.

20. The data processing system of claim 15, wherein the memory page is a first memory page, wherein the processor further executes the computer usable program code:

to receive a request to access a second memory page;

responsive to receiving the request to access the second memory page, to request to page out the first memory page from the shared memory pool.

21. The data processing system of claim 15, wherein the processor further executes the computer usable program code:

responsive to the request to page out the memory page from the shared memory pool, to identify whether the physical space within one of the number of paging space devices has been allocated for the memory page, wherein the memory page has been allocated the physical space if the memory page is mapped to the physical space within a paging data structure; responsive to determining that the physical space within the paging space device has not been allocated for the memory page, to identify the page priority indicator for the memory page from the paging data structure; responsive to identifying the page priority indicator for the memory page, to allocate the memory page to one of the number of memory pools within one of the number of paging space devices, wherein the memory page is allocated to the one of the number of memory pools according to the page priority indicator of the memory page; and to map the memory page to the physical space within the paging data structure.

* * * * *